W. I. JONES.
SHEARS.
APPLICATION FILED APR. 4, 1914.
1,129,685.
Patented Feb. 23, 1915.
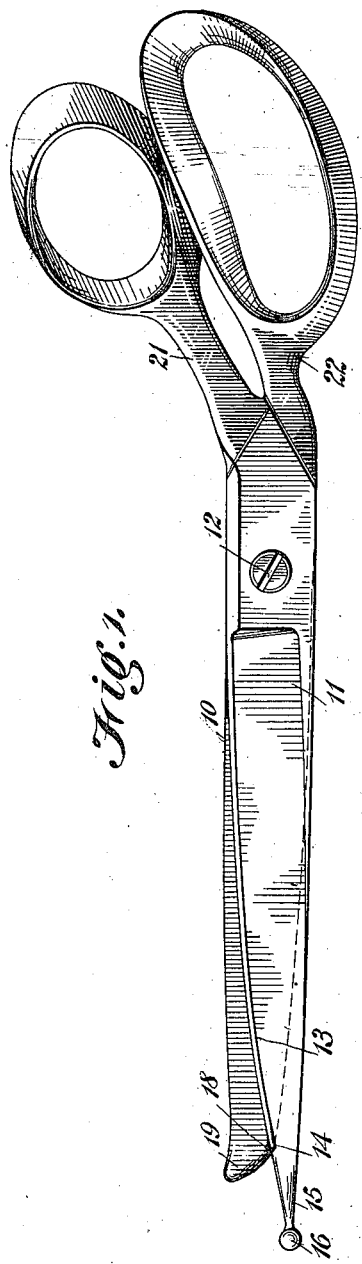
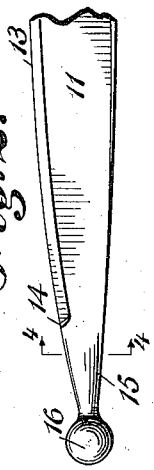
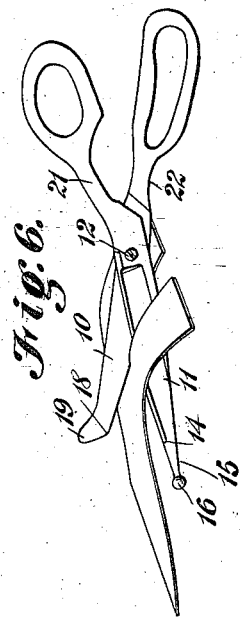
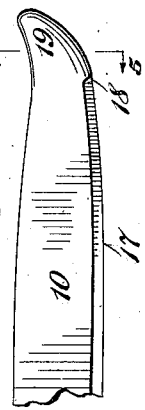
WITNESSES
INVENTOR
Washington I. Jones
BY
ATTORNEYS

UNITED STATES PATENT OFFICE.

WASHINGTON IRVING JONES, OF RUSHVILLE, NEW YORK.

SHEARS.

1,129,685.  Specification of Letters Patent.  Patented Feb. 23, 1915.

Application filed April 4, 1914. Serial No. 829,482.

*To all whom it may concern:*

Be it known that I, WASHINGTON I. JONES, a citizen of the United States, and a resident of Rushville, in the county of Yates and State of New York, have invented new and Improved Shears, of which the following is a full, clear, and exact description.

My invention relates to improvements in shears more particularly adapted for use by tailors in cutting patterns and garments.

The invention consists of two blades articulated together, both upper and lower blades having extensions from the cutting edges of the blades. The extension on the upper blade which is called a guard, extends upwardly and forwardly relatively to the cutting edge of the said blade, and the extension on the lower blade which is called a leader, tapers outwardly from the lower blade and is provided with an enlarged rounded forward terminal.

Additional objects of the invention will appear in the following specification in which the preferred form of my invention is disclosed.

In the drawings similar reference characters refer to similar parts in all the views in which—

Figure 1 is a side elevation of my improved shears; Fig. 2 is an enlarged fragmentary view of the forward end of the lower blade; Fig. 3 is an enlarged fragmentary view showing the forward end of the upper blade; Fig. 4 is a sectional view on the line 4—4 of Fig. 2; Fig. 5 is a sectional view on the line 5—5 of Fig. 3; and Fig. 6 is a perspective view showing how the shears are used.

By referring to the drawings it will be seen that the shears have blades 10 and 11, which are articulated together at 12, the blade 11 having a cutting edge 13, the forward end of which terminates at 14. Beyond this cutting edge 13 the blade 11 is provided with a leader 15 which extends forwardly, substantially the same thickness of the blade, but with rounded edges. The leader 15 tapers forwardly and terminates at its forward end in an enlarged rounded head 16. The object of the leader 15 having the head 16 is to continuously hold the edge of the cloth up from the table while permitting the operator to cut with the shears to the full length of the cutting surfaces. It will be understood that the leader 15 will remain under the material which is being cut when the said material has been severed up to the forward end 14 of the cutting edge 13 so that the operator may quickly advance the shears for the next stroke without it being necessary for him to make any movement to make sure that the material, which is being cut, is disposed above the blade 11 of the shears. It will also be understood that the rounded head 16 will prevent the lower blade 11 from catching into the material which is being cut while it will enable the operator to move the shears readily forward as the rounded head 16 is moved smoothly over the surface of the table on which the material is disposed.

The upper blade 10 has a cutting edge 17, the forward end of which terminates at 18 substantially at the forward end 14 of the cutting edge 13 of the blade 11 when the blades 10 and 11 are moved together to sever the material disposed therebetween. This upper blade 10 has a guard 19 which is substantially of the same thickness as the blade 10, the guard 19 extending forwardly and upwardly and with a rounded lower surface 20. The object of this guard is to prevent any pricking or catching of the forward end of the upper blade in the material which is being cut, this guard 19 also serving to prevent the material which is being cut from moving over the upper blade 10. As the material is held up from the table by the leader 15 and as this material is at the same time prevented from moving over the upper blade 10 by the guard 19, it will be understood that at the termination of each stroke of the shears, the material beyond the cut which has been made, will be disposed at the forward ends 14 and 18 of the cutting edges of the shears, so that the uncut material may move freely between the blades when the said blades are moved apart in the customary manner.

The handles 21 and 22 of the shears may be bent upwardly and rearwardly to permit of the back of the handle on the upper blade 10 to rest flat or nearly so upon the cutting table, in order that the hand of the operator may be disposed above and free from coming in contact with the pattern or other marking on the material which is to be cut.

Having thus described my invention I claim as new and desire to secure by Letters Patent:

In a pair of shears, two blades having cutting edges and articulated to each other, a leader tapering forwardly from the cutting edge of one of the blades and with an enlarged rounded forward end, and a guard extending upwardly from the cutting edge of the other blade, at an angle to the leader and spaced from the leader when the blades are in closed position, the guard having a rounded forward surface.

In testimony whereof I have hereunto signed my name to this specification in the presence of the two subscribing witnesses.

WASHINGTON IRVING JONES.

Witnesses:
 WM. DILLON,
 H. B. SMITH.